United States Patent
Palajac et al.

(10) Patent No.: US 6,179,363 B1
(45) Date of Patent: Jan. 30, 2001

(54) TRANSPORTABLE VEHICLE SEAT

(75) Inventors: Patrick M. Palajac, Dearborn; James G. O'Connor, Oxford, both of MI (US)

(73) Assignee: DaimlerChrysler Corporation, Auburn Hills, MI (US)

( * ) Notice: Under 35 U.S.C. 154(b), the term of this patent shall be extended for 0 days.

(21) Appl. No.: 09/321,780

(22) Filed: May 27, 1999

(51) Int. Cl.$^7$ .................................................. B60N 2/10
(52) U.S. Cl. ..................... 296/65.03; 296/65.01
(58) Field of Search ............................. 296/65.01, 65.03; 297/378.1, 378.13, 378.12

(56) References Cited

U.S. PATENT DOCUMENTS

| | | |
|---|---|---|
| Re. 16,180 | 10/1925 | Chapman et al. . |
| 3,997,213 | 12/1976 | Smith et al. . |
| 4,319,779 | 3/1982 | Leonhart . |
| 4,533,151 | 8/1985 | Maitland . |
| 4,878,680 | 11/1989 | Molnar . |
| 5,238,285 | 8/1993 | Holdampf et al. . |
| 5,308,214 | 5/1994 | Crain et al. . |
| 5,364,152 * | 11/1994 | Mastrangelo et al. ............... 296/65.1 |
| 5,372,398 | 12/1994 | Aneiros et al. . |
| 5,498,051 * | 3/1996 | Sponsler et al. .................... 296/65.1 |
| 5,547,242 | 8/1996 | Dukatz et al. . |
| 5,683,140 | 11/1997 | Roth et al. . |
| 5,711,505 | 1/1998 | Nemoto . |
| 5,911,465 * | 6/1999 | Yamamoto et al. ............... 296/65.03 |
| 6,024,411 * | 2/2000 | Pesta et al. ............................ 297/325 |
| 6,036,252 * | 3/2000 | Hecksel et al. .................... 296/65.03 |
| 6,039,401 * | 3/2000 | Rus ................................. 297/378.13 |
| 6,053,555 * | 4/2000 | Neale ................................. 296/65.03 |
| 6,056,346 * | 5/2000 | Smuk ................................. 296/65.03 |

* cited by examiner

*Primary Examiner*—D. Glenn Dayoan
*Assistant Examiner*—Mickki Murray
(74) *Attorney, Agent, or Firm*—Marc Lorelli

(57) ABSTRACT

A vehicle seat assembly for a motor vehicle is provided. The assembly includes a cushion section a back section pivotally interconnected. The assembly also includes a wheeled latch assembly that is connected to the cushion section. The wheeled latch assembly includes a seat member and a latch member pivotally interconnected and is urged in one direction by a coil spring. The latch member includes a recess for accepting a striker on the vehicle floor and a projection terminating in a roller. The roller is adopted to aid in transporting the vehicle seat while the seat is removed from the vehicle and is accepted into a U-shaped formation while in the vehicle. The wheeled latch also includes a clasp that can be used to entrap the striker of the vehicle floor within the recess of the latch member. By use of the wheeled latch, a latch assembly at the rear portion of the cushion section and a latch assembly on the back section, the vehicle seat can assume a number of positions: (1) a seating position; (2) a folded position; (3) a tumbled position; and (4) a removed position, whereby the entire vehicle seat is removed from the vehicle.

14 Claims, 4 Drawing Sheets

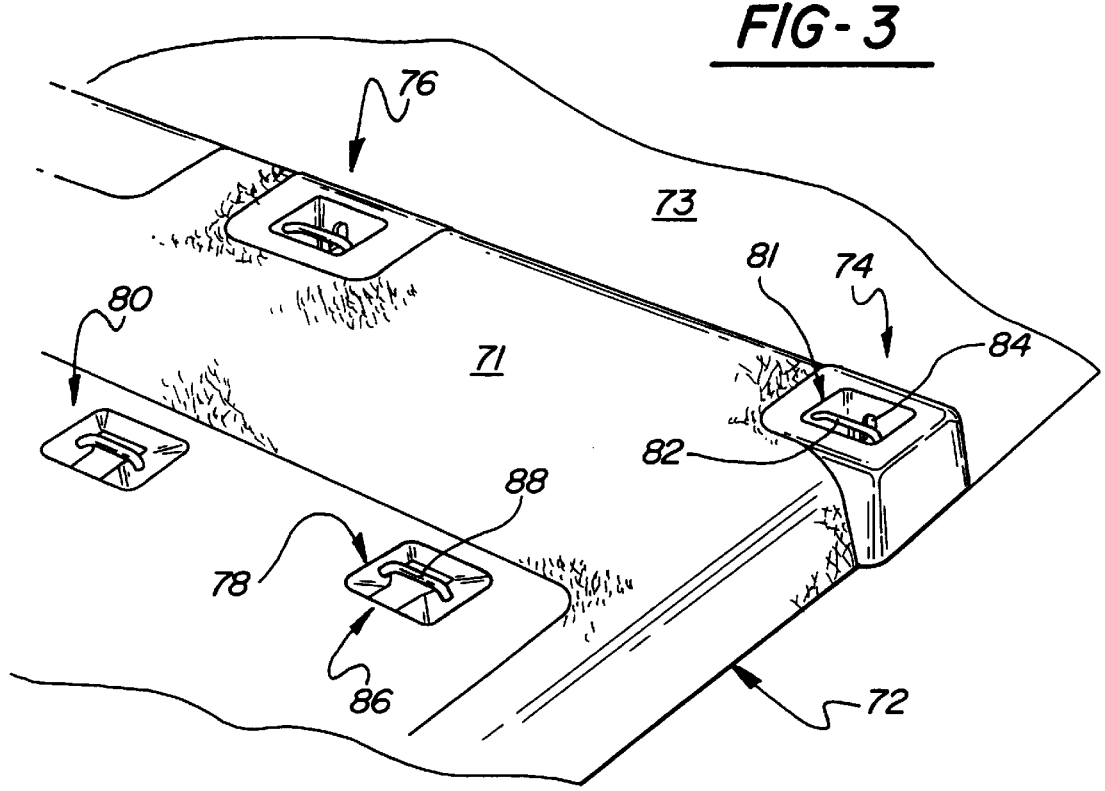

TRANSPORTABLE VEHICLE SEAT

BACKGROUND OF THE INVENTION

1. Technical Field

The present invention relates in general to seat assemblies for motor vehicles. More particularly, the present invention relates to vehicle seats that are adapted to be removed and easily transported by the use of rollers. More specifically, but without restriction to the particular embodiment and/or use which is shown and described for purposes of illustration, the present invention relates to vehicle seats that can be removed from a vehicle and transported with the aid of rollers.

2. Discussion

Automobiles contain a plurality of seating assemblies for use by the driver and the passengers of the vehicle. In an effort to create more versatility in today's vehicles, it is desirable to provide the capability of folding, relocating, or even removing a vehicle seat assembly. This type of versatility is desired in order to increase the cargo space of the vehicle and enhance the utility of the vehicle in order to meet the desires and needs of the driver. Furthermore, there is a need to provide a vehicle seat assembly that can be easily transported once it is removed from the vehicle.

Automobile owners require a tremendous amount of versatility in their vehicle. For example, a driver may want to carry five passengers comfortably to a social event. Shortly thereafter, the driver may want to pick up a couch from the furniture store or some lumber from the home improvement store. Large items such as lumber and furniture may not fit in a conventional vehicle with the seat assemblies positioned to carry passengers. Therefore, it is desireable, not only to move or transition the seat within the vehicle to provide more useable cargo space, but also to remove the seat assembly. In addition, the removal of the seat needs to be easy, and the transportation of the seat assembly cannot be onerous.

In order to provide this increases utility, a number of varying seat arrangements have been devised that are foldable and removable. Many have even provided means to transport the seat about easily. One such example is disclosed in commonly assigned U.S. Pat. No. 5,372,398, issued Dec. 13, 1994 and titled "Vehicle Seat Assembly With Retracting Latch/Engaging Roller Seat-To-Floor Lock". '398 describes a seat latching assembly that can be used to lock the seat into place, or to activate rollers that can be used to transport the seat assembly out of the vehicle. The rollers are attached to the bottom of the vehicle seat so that the seat can be rolled out of the rear liftgate. Although this and other present seat assemblies perform satisfactorily, the designs tend to be bulky and overly complex. Furthermore, the '398 design requires the operator to disengage the latch from the rear of the seat that can be burdensome at times.

Although the '398 seat provides its desired function, there is a need to provide a seat assembly that can be folded, tumbled, removed easily out of the side door of a vehicle, and transported smoothly by the use of rollers, skis or similar means.

SUMMARY OF THE INVENTION

Accordingly, it is a principal objective of the present invention to provide a truly versatile and effective vehicle seat.

It is another objective of the present invention to provide a vehicle seat that can be folded, tumbled, and removed from the side door of a vehicle.

It is still another objective of the present invention to provide a vehicle seat that can be removed from a vehicle and transported easily by the use of rollers.

It is a more particular objective of the present invention to provide a vehicle seat assembly that can folded, tumbled, and removed form a vehicle such that a roller extends, at least partially, beyond an edge of the seat so that it can be transported easily on the rollers with the aid of a handle disposed on an opposing side of the seat.

In one form, the present invention provides a vehicle seat assembly having a roller for easy transportation thereof. The vehicle seat includes a cushion section, a back section, and preferably a headrest. The cushion section includes a front edge, a rear edge, a top surface, and a bottom. The front edge and the bottom interconnect at a lower edge. A wheeled latch is attached to the cushion section near the front edge thereof. The wheeled latch includes a seat member and a latch member pivotally interconnected at a pivot pin. The seat member is attached to the bottom of the cushion section. The latch member includes a recess to accept a striker disposed on the vehicle floor and a projection terminating in a roller. The vehicle floor also includes a U-shaped formation to accept the roller. The roller includes a shaft connected to the projection that terminates at both ends in wheels. A coil spring is disposed between the latch member and the seat member to urge pivoting in one direction about the pivot pin such that the roller extends from the seat member in a direction substantially parallel to the bottom and top surfaces of the cushion section. The coil spring urges the latch member is a direction away from the rear edge of the cushion section and towards said bottom of said cushion section. The roller is capable of extending at least partially beyond the lower edge of the cushion section of the vehicle seat. The wheeled latch also includes a clasp that can be pivoted relative to the latch member such that the striker can be entrapped between the recess of the latch member and a cup formed within the clasp. The entrapment of the striker limits all motion of the latch member except rotational motion. Rotational motion of the latch member is limited by the U-shaped formations reception of the roller or any other portion of the latch member.

While the clasp is in the unlatched or open position, the vehicle seat can be installed in the vehicle or removed from the vehicle. The seat can be removed from the vehicle while the seat is tumbled and the clasp is unlatched by raising the seat in a vertical fashion. A handle is provided that extends from the cushion section to provide ease is removing and transporting the seat. Once the seat is removed from the vehicle it can be transported by allowing the rollers to contact the ground and by pulling on the handle. The handle is disposed at an opposing side of the vehicle seat from the wheeled latch. The handle extends from the vehicle seat in a direction substantially parallel to the top and bottom surface of the vehicle seat and also substantially parallel to the direction at which the roller extends from the seat member.

The vehicle seat is installed into the vehicle by vertically placing the wheeled latch in contact with a forwardly placed striker assembly. The wheeled latch is directed such that the striker is received by the recess and the roller is received by the U-shaped formation. Once such installation has occurred, the clasp can be pivoted such that the striker is entrapped between the recess and the clasp. The seat is installed in the tumbled position as shown in FIG. 8. The seat can then be transitioned to a seating position by first pivoting the cushion and back sections such that the cushion section becomes closer to the floor. This is against the tendencies of the coil spring that has been previously described. The cushion section is pivoted until a latch assembly disposed on the rear portion of the bottom of the cushion section contacts a rearward striker assembly disposed on the floor of the vehicle. The latch assembly and the rearward striker assembly are removeably coupled together. While the rear portion of the cushion section and the vehicle floor are coupled together, pivoting of the latch member and seat member, as urged by the coil spring, is restricted. The seat is now in the folded position. In the folded position, it should be appreciated that the roller no longer extends from the seat member in a manner parallel to the top and bottom surfaces of the seat assembly. Due to the pivoting between the latch member and the seat member, the roller now extends from the seat member in a manner substantially perpendicular to the bottom and top surfaces of the cushion section. The cushion section and the back section are pivotally interconnected such that the back section can either form folded position to form an upright seating position as shown in FIG. 7. In the upright seating position, the back section is removeable engaged to the C-pillar of the vehicle via a latching and striker assembly. Only while the latch and striker assembly are disengaged can the back section be pivoted.

The present invention also provides a strap that is attached to the seat on one end and includes a clip on the other end for attaching to the B-pillar of the vehicle while the seat is in the tumbled position. The present invention also provides a spring mechanism for use with the afore-mentioned clasp. The spring acts to urge the clasp into either the latched or unlatched positions. The wheeled latch also includes a spring interconnecting said clasp and said latch member. The spring includes a maximum expansion point at a predetermined location between said latched and un-latched positions so that said clasp will be urged to either said to latched and un-latched positions depending on said clasps relation to said maximum expansion point. The latched and un-latched positions of the clasp are minimum expansion or lowest spring force positions for the clasp, therefore, the spring will always urge the clasp to one of those two positions. When the clasp is in a transitional position between the latched and the un-latched position, the spring's retraction force acts to urge the clasp into either the latch or un-latched position, depending on which side of the maximum expansion of the spring the clasp is placed Additional benefits and advantages of the present invention will become apparent to those skilled in the art to which this invention relates from a reading of the subsequent description of the preferred embodiment and the appended claims, taken in conjunction with the accompanying drawings.

BRIEF DESCRIPTION OF THE DRAWINGS

The drawings, which form an integral part of the specification, are to be read in conjunction therewith, and like reference numerals are employed to designate identical components in various views:

FIG. 3 is a perspective view of the vehicle floor where the vehicle seat of the present invention can be attached;

FIG. 4A is a spring-side view of the wheeled latch of the vehicle seat of the present invention, in its non-latched position;

DETAILED DESCRIPTION OF THE PREFERRED EMBODIMENT

Figure 1:
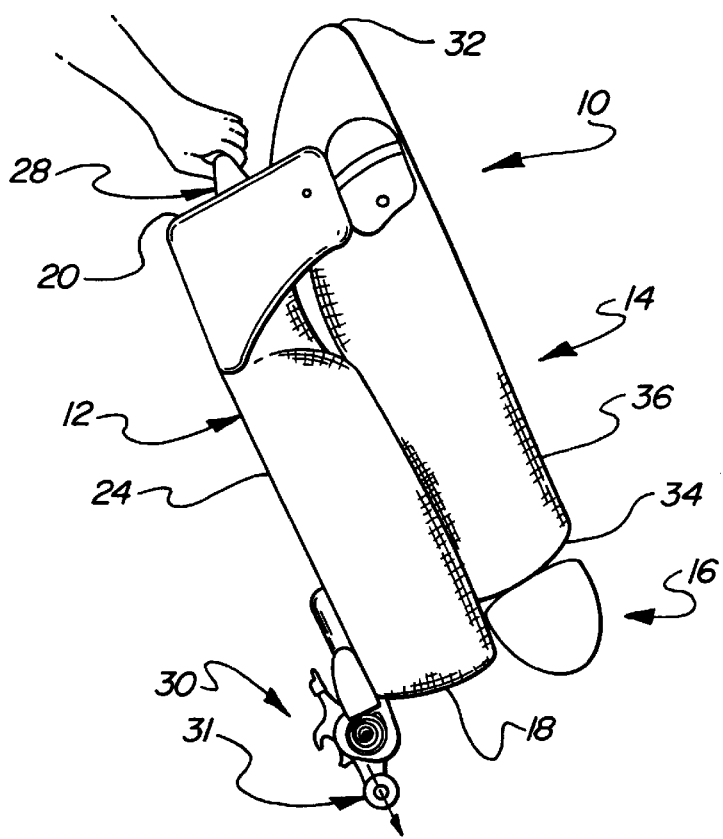
FIG. 1 is a side view of the vehicle seat of the present invention removed from the vehicle.

Referring now to the drawings, there is depicted a vehicle seat illustrating the preferred embodiment of the present invention. With reference to FIG. 1, the vehicle seat of the present invention is generally indicated by numeral 10. The seat 10 includes a cushion section 12, a back section 14, and a headrest 16. Cushion section 12 is generally rectangular and is defined by a front edge 18, a rear edge 20, top surface 22, bottom 24, and a pair of opposing side-walls 26. The bottom 24 and the front edge 24 interconnect at a location referred to as the lower edge 19. It should be appreciated that the lower edge 19 may not be a defined edge as in the preferred embodiment. The lower edge 19 is defined as the point at which the bottom begins to transition and turn upward to form front edge 18. Wheeled latch 30 is attached to bottom 24 of cushion section 12 near the front edge 18 thereof. Wheeled latch 30 includes a roller 31 that can be extended beyond the front edge 18 and is adopted to be rolled upon the ground while transporting the vehicle seat 10. Roller 31 of wheeled latch 30 extends from the seat 10 in a direction 27 substantially parallel to the surface of bottom 24 of cushion section 12. It should be appreciated that roller 31 is only required to extend partially beyond the lower edge 19 of the front edge 18 in order to function properly. A handle 28 is attached at the rear edge 20 of cushion section 12 in order to aid in transportation of the vehicle seat 10. Handle 28 extends from the vehicle seat in a direction substantially parallel to the extension of said at least one roller and substantially parallel to the surface of bottom 24 of cushion section. It can be appreciated from FIG. 1 that handle 28 extends from the edge of seat 10 that is opposite the wheeled latch 30 and roller 31. The back section 14 is pivotally connected to the cushion section 12 near the rear edge thereof. Back section 14 includes a bottom edge 32, a top edge 34, a seat back 36, a front surface 38, and a pair of opposing side-walls 40. Preferably, a headrest 16 is adjustably engaged to back section 14 at top edge 34.

Figure 2:
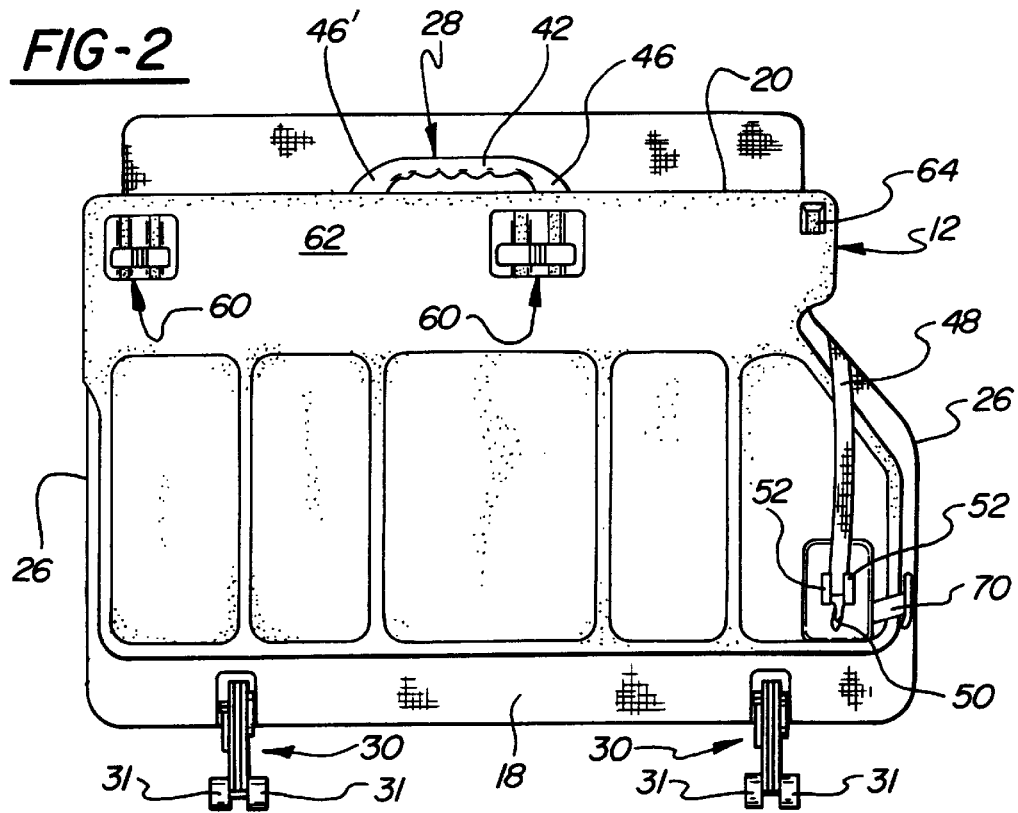
FIG. 2 is a rear view of the vehicle seat of the present invention removed from the vehicle.

Turning to FIG. 2, vehicle seat 10 is shown removed from the vehicle from a rear perspective. FIG. 2 illustrates handle 28 in greater detail which includes an elongated structure 42 with hand grips 44 and two downstanding arms 46 and 46' disposed on opposite sides of the elongated structure 42. FIG. 2 also illustrates strap 48 and clip 50 disposed in their storage position. Strap 48 is secured to seat 10 at one end and terminates in clip 50 at its other end. Clip 50 can be inserted into holding mechanism 52 that is disposed on the bottom 24 of cushion section 12. Holding mechanism 52 consists of cooperating plastic formations 54 and 54' that are adapted to fit clip 50 snugly therebetween. Bottom 24 of cushion section 12 also includes, preferably, two latch assemblies 60.

The latch assemblies 60 are used to couple the rear portion 62 of the cushion section 12 to the vehicle floor (not shown in FIG. 2) and will be described subsequently in greater detail. Latch assemblies 60 are operated by means of lever 70. Lever 70 is disposed near the side-wall 26 of the cushion portion 12 of the vehicle seat 10. Cushion section 12 of vehicle seat 10 preferably includes a rubber mount 64 that projects therefrom. Rubber mount 64 is used to reduce vibrational noise of the vehicle seat 10 while installed in a vehicle.

Turning to FIG. 3, a vehicle floor 72 is illustrated. Vehicle floor 72 includes a raised platform 71 and a lower foot platform 73. The vehicle seat 10, preferably attaches to the vehicle floor 72 at 4 locations. Floor 72, specifically the raised platform 71 of the floor 72, includes two forward striker assemblies 74, 76 and two rearward striker assemblies 78, 80. Since the forward striker assemblies 74 and 76 are substantially identical, only one will be described. Forward striker assembly 74 includes a cavity 81 having a laterally extending striker 82 and a generally U-shaped bracket 84 formed therein. Rearward striker assemblies 78 and 80 are also substantially identical, therefore, only one will be described in detail. Rearward striker assembly 78 includes a cavity 86 with a laterally extending striker 88 disposed therein Referring now to FIG. 4A, a cross sectional view of forward striker assembly 74 is provided. FIG. 4A includes the wheeled latch 30 of the vehicle to seat 10 viewed from the spring-side 89. The wheeled latch 30 in FIG. 4A is shown in the unlatched and tumbled position, which is indicative of installation of the seat 10 in to the vehicle. U-shaped bracket 84 projects from the lower surface 90 of cavity 81 and includes a forward and rearward formation, 92 and 94 respectively. Wheeled latch 30 includes a seat member 100 and a latch member 102 interconnected by a pivot pin 104 that is solidly attached to latch member 102. A coil spring 106 is disposed between the pivot pin 104 and seat member 102 via peg 108. Coil spring 106 acts to urge seat member 100 and latch member 102 to maintain the orientation shown in FIG. 4A. The range of movement between seat member 100 and latch member 102 will be discussed subsequently.

Latch member 102 includes a projection 110 extending therefrom in the direction indicated by reference numeral 27. Projection 110 terminates near roller 31. Roller 31 includes a shaft 112 that extends in a direction perpendicular to projection 110. Shaft 112 has a diameter 114 that is slightly smaller than the distance between formation 92 and 94 of the U-shaped bracket 84. Shaft 112, by its relationship with U-shaped bracket 84 limits movement of the latch member 102 in the forward and rearward direction. Shaft 112 terminates on either side by wheels 131 that are disposed to rotate in order to aid in the transportation of vehicle seat 10. Shaft 112 with wheels 131 limit movement of the latch member in the lateral or cross car direction by the wheels 131 contact with the U-shaped formation 84. Latch member 102 also includes a recess 113 that is adapted to accept striker 82 therein. As vehicle seat 10 is translated from a position outside of the vehicle (see FIGS. 1 and 2) to the position shown in FIG. 4B, projection 110 with shaft 112 is guided into U-shaped bracket 84 at the same time that recess 113 is guided towards striker 82. It can be appreciated that once in this position, some movement of the seat 10 is restricted, however the seat can still move vertically upward and may also slightly pivot about shaft 112 with such upward movement. Latch member 102 also includes a pivotable clasp 116. Clasp 116 includes a handle 118 and a cup portion 120.

Figure 5:
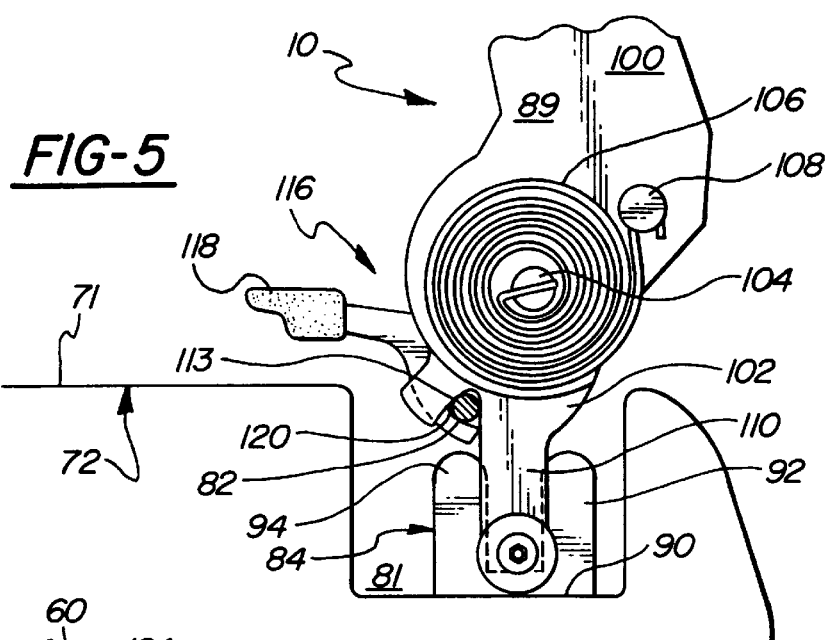
FIG. 5 is a spring-side view of the wheeled latch of the vehicle seat of the present invention, in its latched position.

Clasp 116 is adopted to pivot about latch member 102 and receive striker 82 within cup 120 as shown in FIG. 5. It should be appreciate that clasp 116 acts to rotatably couple latch member 102 to striker 82. However, any possible rotational movement of the latch member 102 is prevented by the reception of the projection 110 with roller 114 in U-shaped formation 84. The pivotable clasp 116 will be described in detail subsequently. It should, however, be appreciated that by shaft 112 relationship with the U-shaped bracket 84 and the striker 82 being entrapped between recess 112 and cup portion 120 of clasp 116, latch member 102 is effectively coupled to the vehicle floor 72. This creates a locking system that can eliminate movement between the latch member 102 and the vehicle floor 72 by rotatably coupling one point and by longitudinally and laterally locking another point.

Figure 4B:
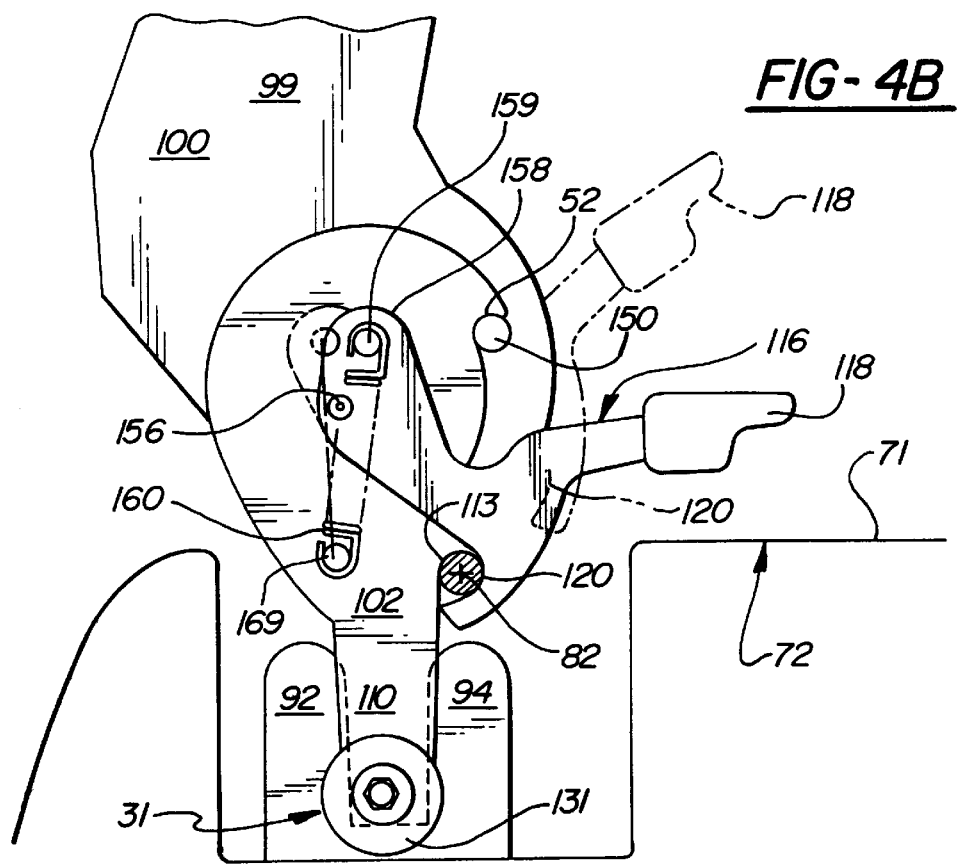
FIG. 4B is a clasp-side view of the wheeled latch of the present invention in the latch position, the view includes the wheeled latch in the nonlatched position shown by phantom lines.

The range of movement between seat member 100 and latch member 102 can be shown in FIG. 4B. FIG. 4B is a cross sectional view of forward striker assembly 74 similar to FIG. 4A except that it is taken from the clasp-side 99. Clasp-side 99 is opposite of spring-side 89 shown in FIG. 4A. The coil spring can 106 force the rear portion 62 of cushion section 12 away from the vehicle floor 72 until post 150 contacts the end 152 of a curved or partial slot 154. Post 150 with its cooperation with slot 154 acts to limit the range of pivoting between the latch member 102 and the seat member 100. Post 150 projects from seat member 100 of the wheeled latch 30 and partial slot 154 is formed in the latch member 102.

The operation of clasp 116 is also shown in greater detail in FIG. 4B. Clasp 116 is pivotally connected to the latch member 102 at a pivot pin 156. Clasp 116 is allowed to pivot about the pin 156 such that cup portion 120 can be disposed about recess 113 of latch member 102 to entrap striker 82 therein, as shown in FIG. 4B. Clasp 116 can also pivot such that striker 82 is not entrapped within recess 113 as illustrated in phantom in FIG. 4B. Clasp 116 includes a arm 158 that is attached to a spring 160 via cylindrical projection 159. Spring 160 is attached to a fixed point 169 on the latch member 102 at its other end. The spring 160 reaches its maximum expansion at a pre-determined location while the clasp 116 is between the latched (shown in FIG. 4B) and un-latched (shown in FIG. 4B in phantom) positions. Spring 160 acts to force clasp into either the latched or the un-latched position depending on its relation to the maximum expansion of spring 160. It should be appreciated that the latched and un-latched positions correspond to the least retractive force or the minimum expansion of the spring 160. If the clasp 116 is in a transitional position between the latched and the unlatched position, the spring 160 retraction force acts to urge the clasp into either the latch or unlatched position, depending on which side of the maximum expansion of the spring 160 the clasp is placed.

Figure 6:
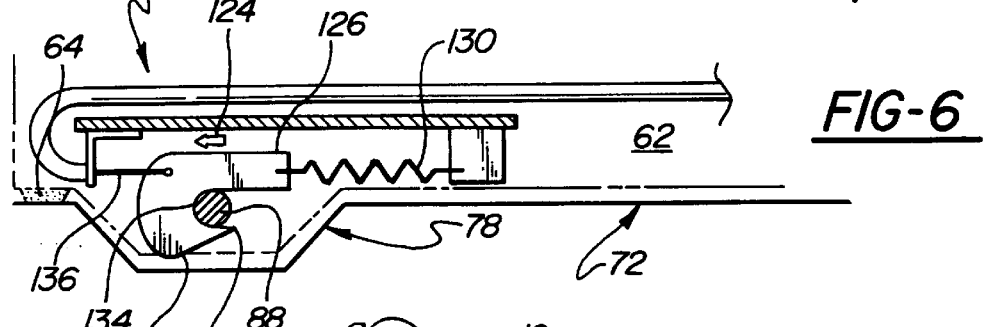
FIG. 6 is a side view of the latch securing the rear end of the vehicle seat of the present invention.

Rearward striker assembly 78 of FIG. 3 is adapted to receive latch assembly 60 of vehicle seat 10. FIG. 6 provides a cross sectional view of rearward striker assembly 78 and latch assembly 60 shown in the latched or coupled position. After wheeled latch 30 of vehicle seat 10 is placed into position and coupled to the vehicle floor 72 as shown in FIG. 5. The seat 10 can be about pivot pin 104 such that the rear portion 62 of cushion section 12 moves closer to the floor 72, which is against the tendencies of coil spring 106. Seat 10 is pivoted until rubber mount 64 contacts floor 72. Just before rubber mount 64 contacts floor 72 hook 126 of latch assembly 60 contacts striker 88. Inclined surface 128 of hook 126 contacts striker 88, striker 88 forces hook 126 to move longitudinally in a direction 129 against the spring force of elastic member 130. The hook 126 will slide as striker 88 is in contact with inclined surface 128 until striker 88 passes tip 132, at which point elastic member 130 causes caused hook 126 to return to a static position as shown in FIG. 6. In this position, striker 88 is accepted by recess 134 which will prevent pivoting of the vehicle seat 10 about pivot pin 104 while the latch assembly 60 and the rearward striker assembly 78 are coupled, as illustrated in FIG. 6. The latch assembly 60 and the rearward striker assembly 78 can be de-coupled by activation of lever 70 (shown in FIG. 2) which places tension on cable 136 such that hook 126 moves longitudinally against the tendencies of elastic member 130, in the direction indicated by arrow 129. Once tip 132 clears striker 88, cushion section 12 will pivot about pivot pin 104 due to the action of coil spring 106.

Figure 7:
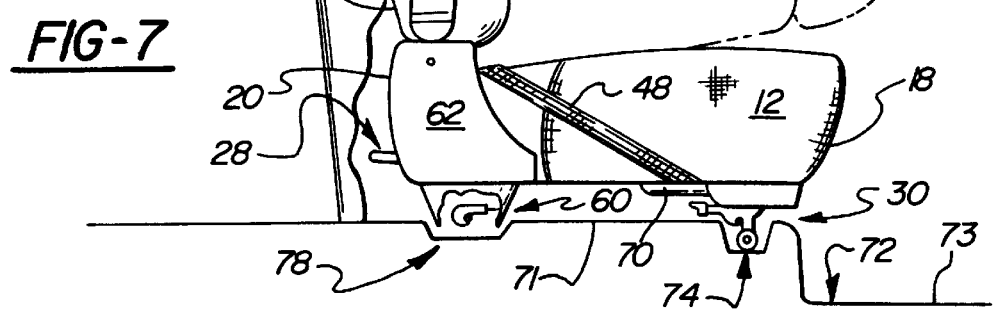
FIG. 7 is a side view of the vehicle seat of the present invention disposed in a seating position within the vehicle, the view also includes the vehicle seat folded shown by phantom lines.

Turning to FIG. 7, once the cushion section 12 is coupled to the floor 72 at the wheeled latch 30 and the latch assembly 60, the back section 14 can be pivoted upward until latch assembly 138 contacts a striker 149 disposed on the rearward pillar or the C-pillar 151 of the vehicle. Latch assembly 138 is substantially identical to and behaves in substantially the same manner as previously described latch assembly 60. Latch assembly 138 can be de-coupled from the C-pillar of the vehicle by activating knob 140, again knob 140 acts in substantially the same manner as lever 70.

Figure 8:
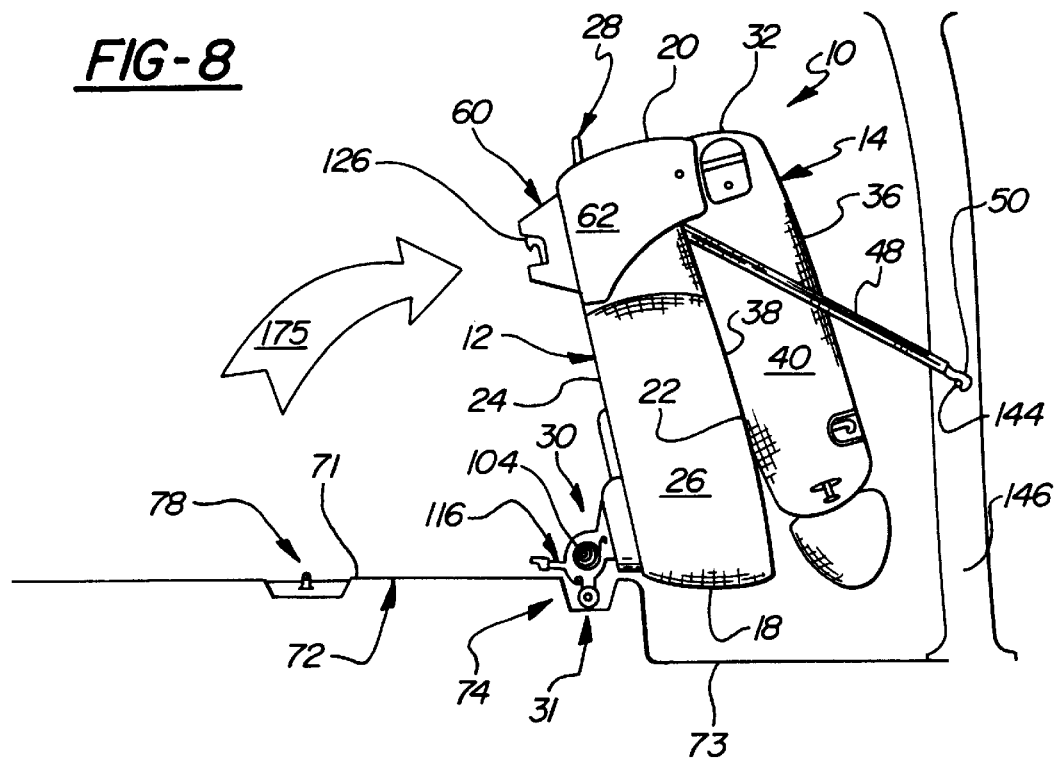
FIG. 8 is a side view of the vehicle seat of the present invention disposed in a tumbled position within the vehicle.

With continued reference to FIG. 7, vehicle seat 10 is illustrated in the seating position. The seating position is achieved by coupling wheeled latch 30 and latch assembly 60 to the vehicle floor 72 and coupling latch assembly 138 to the C-pillar 151 of the vehicle. Once knob 140 is activated, seat back 14 is de-coupled from the C-pillar and can be folded or pivoted about point 142, such that seat back 36 forms a substantially planar surface parallel with vehicle floor 72. From the folded position, shown in phantom in FIG. 7, lever 70 can be activated to de-couple latch assembly 60 from floor 72. After latch assembly 60 is de-coupled, coil spring 106 acts to urge cushion section 12, along with back section 14 and headrest 16, to tumble or pivot about pivot pin 104 as shown in FIG. 8. The tumbling or pivoting motion is indicated in FIG. 8 by arrow 175. While in the tumbled position, strap 48 is preferably removed from holding mechanism 52 and clip 50 is attached to a structure 144 on the forward or B-pillar 146 of the vehicle. Strap 48 and clip 50 are used to ensure seat 10 remains in a properly tumbled position. From this tumbled position, seat 10 can be removed from the vehicle. The strap 48 and clip 50 first need to be detached from the B-pillar. Then clasp 116 must be de-coupled by pivoting handle 118 upward. Once the clasp 116 is de-coupled from striker 82, then vehicle seat 10 can be removed in an upward fashion. Once removed from the vehicle, the rollers 31 can rotate along the ground while being pulled by and individual using the handle 28 as a means to grab the vehicle seat 10. It should be appreciated that handle 28 can also be utilized when the vehicle seat 10 needs to be removed in an upward fashion from forward striker assembly 74.

While the above description constitutes the preferred embodiment of the invention, it will be appreciated that the invention is susceptible to modification, variation, and change without departing from the proper scope or fair meaning of the accompanying claims.

What is claimed is:

1. In a vehicle having a forward and rearward pillar, a vehicle seat assembly comprising:

a vehicle floor having at least one striker assembly, said striker assembly having a striker;

a cushion section having a front edge and a rear edge;

a back section pivotally attached to said cushion section, wherein a seating position is defined when said cushion section is disposed substantially parallel to said vehicle floor and said back section is substantially permendicular to said vehicle floor and wherein said cushion section and said back section are pivotable into a tumbled position wherein said cushion section and said back section are both substantially perpendicular to said vehicle floor and wherein said cushion section and said back section are moveable into a folded position such that said cushion section and said back section are both substantially parallel to said vehicle floor;

a wheeled latch assembly attached to said cushion section near said front edge;

a latch assembly attached to said cushion section and adapted to be removeably attached to said vehicle floor rearward of said wheeled latch assembly;

wherein said wheeled latch assembly includes a seat member and a latch member pivotally interconnected, said seat member is coupled to said cushion section near said front edge, said latch member includes a projection that includes a roller attached to the end thereof and a recess adapted to receive said striker, wherein said latch member of said wheeled latch assembly can only be engaged or disengaged while said seat back and said seat cushion are in said tumbled position, and wherein said latch member cannot be engaged or disengaged by an operator while said seat back and seat cushion are in said seating position or said folded position.

2. The vehicle seat assembly as set forth in claim 1, wherein said floor includes a raised platform and a lower foot platform, said at least one striker assembly disposed on said raised platform.

3. The vehicle seat assembly as set forth in claim 2, wherein said striker assembly is disposed within a cavity in said raised platform of said floor.

4. The vehicle seat assembly as set forth in claim 3, wherein said striker assembly includes a formation to receive said roller of said wheeled latch assembly.

5. The vehicle seat assembly as set forth in claim 4, wherein said formation is U-shaped and projects upwards from a lower surface formed by said cavity, said formation is adapted to prevent forward and backward movement of said projection.

6. The vehicle seat assembly as set forth in claim 1, further comprising a handle attached to said rear edge of said cushion section to aid in transporting the vehicle seat.

7. The vehicle seat assembly as set forth in claim 1, wherein said roller includes a shaft interconnecting two wheels.

8. The vehicle seat assembly as set forth in claim 1, wherein said wheeled latch includes a post disposed within a curved slot to limit to range of pivoting between said latch member and said seat member.

9. The vehicle seat assembly as set forth in claim 1, wherein said wheeled latch includes a clasp, said clasp including a pivot point, a handle and a cup, said clasp is pivotally attached to said latch member at said pivot point, said clasp pivotable such that said cup can entrap said striker within said recess.

10. The vehicle seat assembly as set forth in claim 9, wherein said clasp is capable of transitioning between an un-latched position and a latched position, said latched position depicted by said cup disposed about said recess of said latch member.

11. The vehicle seat assembly as set forth in claim 10, wherein said wheeled latch also includes a spring interconnecting said clasp and said latch member, said spring includes a maximum expansion point at a pre-determined location between said latched and un-latched positions so that said clasp will be urged to either said to latched and un-latched positions depending on the relation of said clasp to said maximum expansion point.

12. The vehicle seat assembly as set forth in claim 1, further comprising a strap having a first and second end, said first end being attached to said cushion section and said second end terminating in a clip formation.

13. In a vehicle having a forward and a rearward pillar, a vehicle seat assembly comprising:
- a vehicle floor having at least one striker assembly, said vehicle floor having a raised platform and a lower foot platform, said striker assembly including a U-shaped formation and a striker;
- a cushion section having a front edge, a rear edge, a top surface, and a bottom;
- a back section having a bottom edge, top edge, seat back, and front surface, said back section pivotally attached to said cushion section near said rear edge, said back section capable of being pivoted such that said seat back is substantially parallel to the vehicle floor;
- a handle attached to either the cushion section or the back section;
- a latch assembly attached to said back section adapted to be removeably attached to the rearward pillar of the vehicle;
- a wheeled latch assembly attached to said cushion section near said front edge;
- a latch assembly attached to said cushion section adopted to be removeably attached to said vehicle floor rearward of said wheeled latch assembly;
- wherein said wheeled latch assembly includes a seat member and a latch member pivotally interconnected, said seat member is coupled to said cushion section near said front edge, said latch member includes a projection that includes a roller attached to the end thereof and a recess adapted to receive said striker; said projection with said roller is adapted to be received by said U-shaped formation, said wheeled latch also includes a clasp that can be pivoted such that said striker can be entrapped between said recess and said clasp.

14. The vehicle seat assembly as set forth in claim 10, wherein said latch member can be rotatably attached to said striker and wherein said U-shaped formation acts to prevent said latch member from rotating about said striker.

* * * * *